UNITED STATES PATENT OFFICE.

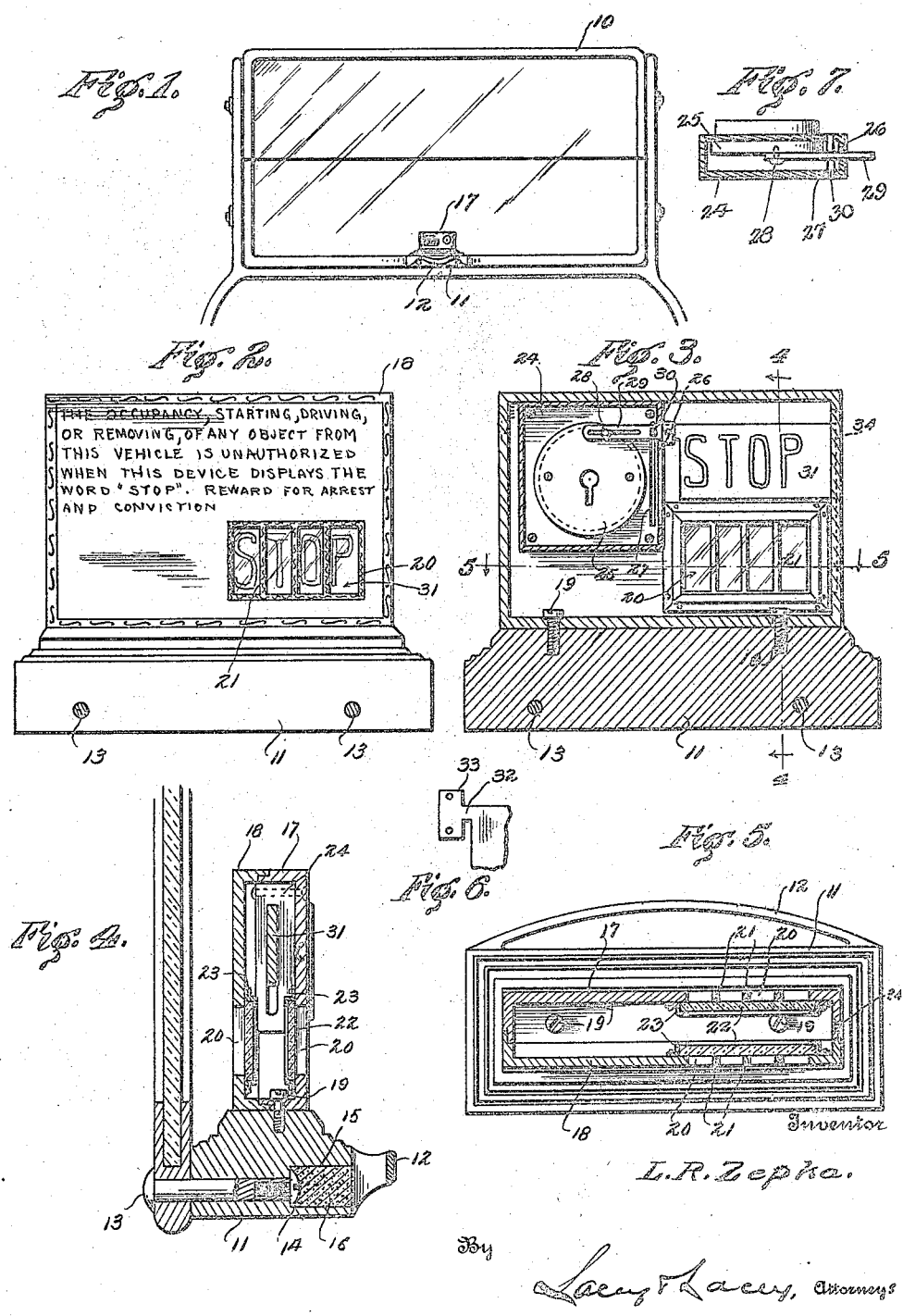

LUDWIG R. ZEPKA, OF CLEVELAND, OHIO.

THEFT SIGNAL FOR MOTOR VEHICLES.

1,425,159.   Specification of Letters Patent.   Patented Aug. 8, 1922.

Application filed July 21, 1921. Serial No. 486,623.

*To all whom it may concern:*

Be it known that I, LUDWIG R. ZEPKA, citizen of the United States, residing at Cleveland, in the county of Cuyahoga and State of Ohio, have invented certain new and useful Improvements in Theft Signals for Motor Vehicles, of which the following is a specification.

This invention relates to an improved theft signal for motor vehicles and has as one of its principal objects to provide a device of this character for displaying a sign indicating the absence from a vehicle of the authorized operator thereof.

A further object of the invention is to provide a signal which will be characterized by structural simplicity and which, at the same time, will prove entirely efficient in practical use.

And the invention has as a still further object to provide a signal which will be neat and attractive in appearance and which may be attached to a vehicle wind shield supplanting the usual handle upon the lower rail of the wind shield frame.

Other and incidental objects will appear hereinafter.

In the drawing:

Figure 1 is a fragmentary elevation looking at the rear side of a motor vehicle wind shield of conventional design, illustrating my improved signal upon the wind shield, Figure 2 is a front elevation of the device, Figure 3 is a vertical section taken medially through the device, Figure 4 is a transverse section on the line 4—4 of Figure 3, looking in the direction of the arrows, Figure 5 is a horizontal section on the line 5—5 of Figure 3, looking in the direction of the arrows, Figure 6 is a fragmentary detail elevation of the signal sign employed, and Figure 7 is a detail section through the lock employed.

Referring now more particularly to the drawing, I have, for convenience, shown my improved device in connection with a motor vehicle wind shield 10 of conventional design. In carrying the invention into effect, I employ a base 11 which is preferably stepped to enhance the appearance thereof and extending from the base at its rear edge is a handle 12. In applying the device, the usual handle of the lower rail of the wind shield frame is removed and the base 12 substituted in lieu thereof, spaced bolts 13 being employed to secure the base to the rail. As will be observed, these bolts are fitted through said rail from the forward side thereof, and threaded into the inner ends of said bolts are cap screws 14 securing the bolts against displacement and lying within suitable recesses 15 in the base. Closing said recesses are appropriate filler plugs 16 preventing access to the screws, as well as locking the nuts upon the bolts. Thus, to all intents and purposes the device will be permanently connected to the wind shield and, as will be seen, the handle 12 may be conveniently grasped for tilting the wind shield when desired. Mounted upon the base is a preferably metallic casing which is formed of mating sections 17 and 18 respectively, the former section being somewhat deeper than the latter section. As suggested in the drawing, this casing is preferably scrolled to enhance the appearance thereof and the joint between the lapped sections is preferably brazed for not only obscuring the joint but also permanently connecting the sections. Securing the casing to the base are spaced cap screws 19 engaged through the bottom wall of the section 17.

The front and back walls of the casing are provided with alined sight openings 20 across which extend bars or slats 21 integral with said walls, and overlying said openings within the casing are closure panes 22 held by suitable retaining strips 23. As will be observed upon reference to Figure 3, the sight openings 20 are disposed adjacent the bottom wall of the casing and mounted within the casing to abut the top wall thereof is an appropriate lock 24. This lock may be of any approved character and may be operated through the back wall of the casing by a suitable key. However, for the purposes of the present invention, the lock comprises a rotatable key operated disc 25, and formed in one end wall of the lock casing is a vertical slot 26 while in the side walls of the casing are slots 27. Projecting from the disc 25 near its periphery is a pin 28 extending through a suitable slot in an arm 29 which is freely received through the slot 26 in the lock casing. Extending transversely through the arm is a flat pin or bar 30 adapted to travel freely in the slots 27, and mounted upon the arm is a signal plate 31 upon each side of which is preferably imposed the word Stop. The letters of the word, in each instance, are preferably painted with radium or luminous paint so as to be visible at night. Extending from one end of the plate at its upper edge is, as shown in Figure 6, an arm 32 provided at its free end with lugs 33. These lugs are bent about the free end of the arm 29 of the lock and riveted or otherwise secured thereto for connecting the signal plate with the lock arm. Formed in the adjacent end of the lock casing is a vertical guide slot 34 slidably receiving the free end of the signal plate.

As suggested in Figure 2, the signal casing is provided upon each of the side walls thereof with a suitable inscription indicating that when the word Stop is displayed at the sight windows 20, starting, occupancy or tampering with the vehicle is unauthorized. Accordingly, in practice, the driver, upon leaving the vehicle, will simply operate the lock 24 for lowering the signal plate 31 to a position between the sight windows 20 so that the word Stop will be visible at each of said windows. As will be readily understood in view of the preceding description, when the disc 25 of the lock is turned in a clockwise direction the signal plate will be lowered while when said disc is turned in a counter-clockwise direction, the disc will be elevated. Accordingly, upon return of the driver to the vehicle, the lock may be operated for elevating the signal plate, as shown in Figure 3, to inactive position.

Having thus described the invention, what I claim as new is:

1. The combination with a tiltable motor vehicle wind shield, of a signal casing mounted upon the wind shield frame and including a handle adapted to be grasped for tilting the wind shield, and signaling means within said casing operable for displaying a signal visible through the wind shield.

2. The combination with a motor vehicle wind shield having a frame provided with openings for receiving bolts to secure a handle, of a theft signal mounted upon said frame including a handle for manipulating the wind shield, fastening means coacting between the signal and said frame extending through said openings, and signaling means operable for displaying a signal visible through the wind shield.

3. A signal of the character described including a casing provided with a sight opening, a lock casing in said first mentioned casing provided with a slot, locking mechanism including a rotatable disc in the lock casing, an arm extending freely through said slot and having free connection with said disc, and a signal member carried by the arm, the disc being movable for shifting the signal member to a position opposite said sight opening.

4. A signal of the character described including a casing provided with a sight opening, a lock casing mounted in the first casing and provided with oppositely disposed slots, locking mechanism including a rotatable disc in the lock casing, an arm extending into the lock casing and having free connection with said disc, a pin carried by the arm slidably engaging in said slots, and a signal member carried by said arm, the disc being rotatable for shifting the signal member to a position opposite said sight opening.

In testimony whereof I affix my signature.

LUDWIG R. ZEPKA. [L. S.]